(12) United States Patent
Succi et al.

(10) Patent No.: US 9,643,845 B2
(45) Date of Patent: May 9, 2017

(54) NITROUS OXIDE REGENERABLE ROOM TEMPERATURE PURIFIER AND METHOD

(71) Applicant: SAES GETTERS S.p.A., Lainate, Milan (IT)

(72) Inventors: Marco Succi, Milan (IT); Cristian Landoni, Novara (IT)

(73) Assignee: SAES GETTERS, S.p.A., Milan (IT)

( * ) Notice: Subject to any disclaimer, the term of this patent is extended or adjusted under 35 U.S.C. 154(b) by 0 days.

(21) Appl. No.: 15/295,978

(22) Filed: Oct. 17, 2016

(65) Prior Publication Data

US 2017/0029273 A1  Feb. 2, 2017

Related U.S. Application Data

(62) Division of application No. 13/866,875, filed on Apr. 19, 2013, now abandoned.

(30) Foreign Application Priority Data

Apr. 24, 2012  (IT) .............................. MI2012A0676

(51) Int. Cl.
*B01D 53/02* (2006.01)
*C01B 21/22* (2006.01)
*B01D 53/04* (2006.01)
*B01D 53/62* (2006.01)
*B01D 53/96* (2006.01)

(52) U.S. Cl.
CPC ............. *C01B 21/22* (2013.01); *B01D 53/02* (2013.01); *B01D 53/0462* (2013.01); *B01D 53/62* (2013.01); *B01D 53/96* (2013.01); *B01D 2253/1122* (2013.01); *B01D 2253/1124* (2013.01); *B01D 2257/504* (2013.01); *B01D 2257/80* (2013.01); *C01B 2210/005* (2013.01); *C01B 2210/0015* (2013.01); *C01B 2210/0051* (2013.01); *C01B 2210/0062* (2013.01);
(Continued)

(58) Field of Classification Search
CPC ...... B01D 2253/1124; B01D 2257/504; B01D 2257/80; B01D 53/02; B01D 53/0462; B01D 53/62; B01D 53/96; C01B 21/22; C01B 2210/0015; C01B 2210/005; C01B 2210/0051; C01B 2210/0062; Y02C 10/04; Y02C 10/08; Y02C 20/10; Y02P 20/152

See application file for complete search history.

(56) References Cited

U.S. PATENT DOCUMENTS

| | | | | |
|---|---|---|---|---|
| 4,631,074 A | * | 12/1986 | Eschner ................ | F24F 5/0014 95/118 |
| 5,366,541 A | * | 11/1994 | Hill .................... | B01D 53/0423 96/124 |

(Continued)

*Primary Examiner* — Christopher P Jones
(74) *Attorney, Agent, or Firm* — TIPS Group

(57) ABSTRACT

A nitrous oxide room temperature purification method, apparatus and system utilizing at least partially oxidized nickel. In an embodiment, a room temperature regenerable $N_2O$ purifier includes a vessel having an inlet and outlet, an active portion being at least partially filled with a purification material comprising nickel oxide and optional elemental nickel, wherein the weight ratio between the nickel oxide and the optional elemental nickel is equal or higher than 3 and the surface area of the nickel oxide and the optional elemental nickel is equal or higher than 50 $m^2/g$.

10 Claims, 2 Drawing Sheets

(52) U.S. Cl.
CPC .............. *Y02C 10/04* (2013.01); *Y02C 10/08* (2013.01); *Y02C 20/10* (2013.01); *Y02P 20/152* (2015.11)

(56) References Cited

U.S. PATENT DOCUMENTS

| | | | | |
|---|---|---|---|---|
| 5,492,682 | A * | 2/1996 | Succi | B01D 53/04 422/171 |
| 5,547,648 | A * | 8/1996 | Buchanan | B01D 53/04 423/210 |
| 6,436,352 | B1 * | 8/2002 | Succi | B01D 53/04 422/171 |
| 2002/0092420 | A1 * | 7/2002 | Jagger | B01D 53/0446 95/96 |
| 2003/0064014 | A1 * | 4/2003 | Kumar | B01D 53/8671 423/210 |
| 2004/0123736 | A1 * | 7/2004 | Torres, Jr. | B01D 53/02 95/116 |
| 2004/0149634 | A1 * | 8/2004 | Hughes | A23L 2/39 210/96.1 |
| 2010/0154629 | A1 * | 6/2010 | Fujitani | H01M 8/04029 95/15 |

* cited by examiner

NITROUS OXIDE REGENERABLE ROOM TEMPERATURE PURIFIER AND METHOD

CROSS REFERENCE TO RELATED APPLICATION(S)

This application is a division of U.S. Ser. No. 13/866,875 filed Apr. 19, 2013, which claims the priority benefit of Italian patent application No. MI2012A000676 filed Apr. 24, 2012, both of which are incorporated herein by reference.

BACKGROUND

The present invention relates to a room temperature purification method and to a room temperature regenerable purification system for Nitrous Oxide.

Nitrous oxide has many industrial uses requiring an accurate control of impurity levels within this gas, among the most demanding ones there are semiconductor manufacturing processes such as chemical vapour deposition, selective oxidations such as in display manufacturing, and rapid thermal oxynitridation process for the fabrication of metal oxide semiconductor (MOS) capacitors.

In all these applications, impurities such as $H_2O$, $CO_2$, CO and similar play a detrimental role by degrading and interfering with the characteristics and performance of the device/component wherein $N_2O$ is used as process gas.

Among the most critical impurities is $CO_2$, which is not easily and efficiently removed by means of the standard industrial distillation processes, such as the ones described in the European patent application EP 0636576, because of the close value of the condensation temperature of $CO_2$ and $N_2O$. For this reason, separation plants are not suitable to achieve a sufficient level of purity for electronic grade $N_2O$, as regards the $CO_2$ content.

In the context of the industrial use of purified Nitrous Oxide, it is important to have a purifier capable of operating normally at room temperature and also of being regenerated, in order to increase the purifier lifetime.

For a $N_2O$ purification process, it is of importance to develop a solution capable of achieving a sufficiently high capacity in order to avoid the use of an excessive amount of purifier media, which would be disadvantageous because of both the associated costs and the volume taken by a purifying system using such media. In addition, a high capacity avoids the need to recur to the regeneration process with an excessive frequency. A suitable target capacity for the purifier material is 0.5 l/l or higher. The liter/liter unit indicates the capability of a given volume (expressed in liters) of the purifier media to remove a volume of gas impurities expressed in standard liters (measured at atmospheric pressure and 0° C.).

Nitrous Oxide purification systems of the prior art generally require cooling apparatus in order to reach levels of efficiency, such as that described in U.S. Pat. No. 7,314,506, comprising cryogenic purification of various gaseous streams, including nitrous oxide, with different materials. Cooling apparatus add cost and complexity to such systems.

These and other limitations of the prior art will become apparent to those of skill in the art upon a reading of the following descriptions and a study of the several figures of the drawing.

SUMMARY

Various examples are set forth herein for the purpose of illustrating various combinations of elements and acts within the scope of the disclosures of the specification and drawings. As will be apparent to those of skill in the art, other combinations of elements and acts, and variations thereof, are also supported herein.

An object of embodiments set forth herein is to provide a room temperature purifier for $N_2O$.

Another object of embodiments set forth herein is to provide an $N_2O$ purification system which can operate continuously by using multiple purification vessels.

In an embodiment, set forth by way of example and not limitation, an improved method for the purification of $N_2O$ includes feeding a $N_2O$ gaseous stream to a vessel having an inlet and outlet, the vessel being at least partially filled with a purification material comprising nickel oxide and optional elemental nickel, wherein the weight ratio between the nickel oxide and the optional elemental nickel is equal or higher than 3 and the surface area of the nickel oxide and the optional elemental nickel is equal or higher than 50 $m^2/g$.

An example vessel suitable for use in the above-described method can be a hermetically sealed vessel, normally made of metal. By way of non-limiting example, the vessel can be made from stainless steel. In this example, a portion of the vessel containing the purification material is defined as an "active portion" of the vessel and defines an internal volume of the active portion. The active portion can be delimited by retaining devices such as, for example, particle filters.

These and other examples of combinations of elements and acts supported herein as well as advantages thereof will become apparent to those of skill in the art upon a reading of the following descriptions and a study of the several figures of the drawing.

BRIEF DESCRIPTION OF THE DRAWINGS

Several examples will now be described with reference to the drawings, wherein like elements and/or acts are provided with like reference numerals. The examples are intended to illustrate, not limit, concepts disclosed herein. The drawings include the following figures.

DETAILED DESCRIPTION OF EXAMPLE EMBODIMENTS

As used herein, the terms "purification media," "material" and the like shall mean a material with the characteristics in terms of NiO/Ni weight ratio and surface area as describe here. In a preferred embodiment, the purification material used as described herein has a surface area of at least 100 $m^2/g$ and the NiO/Ni weight ratio is equal or higher than 5. In an example embodiment, the purification material is essentially completely oxidized such that it consists essentially of NiO (e.g. the Ni weight fraction over NiO is less than 5%).

As will be appreciated by those of skill in the art, the purification material can also include inert materials. For example, in an example embodiment, amorphous silica can be used as a high surface area support for the NiO and Ni. In another example, magnesium oxide can be used as a support for the NiO and/or Ni. By way of further non-limiting examples, the NiO and/or Ni can be coated, adhered or otherwise supported by at least one of amorphous silica and magnesium oxide (i.e. amorphous silica, magnesium oxide or both), as will be appreciated by those of skill in the art. Also, preferably, the method for purifying $N_2O$ is carried out at room temperature (e.g. at about 20-25° C.).

The inventors have surprisingly found that when the target impurity is $CO_2$ in $N_2O$ as matrix gas, it is possible to use oxidized nickel (or to be more precise a high surface media based on oxidized nickel where NiO fraction is preponderant with respect to elemental nickel) as an efficient purification media at room temperature, and more specifically tests carried out on this material have shown that the capacity is consistently higher than 0.5 l/l and that this material is also fully regenerable, fulfilling both the requirements in terms of capacity and media lifetime.

This solution is quite the opposite of that described in U.S. Pat. No. 6,436,352 in the applicant's name, regarding the use of elemental nickel to remove carbon monoxide from a hydrogen stream. It is to be emphasised that the behaviour in terms of capacity and efficiency toward target impurities and to some extent compatibility toward the matrix gas is not foreseeable, as the above mentioned patent shows. More specifically the solution described in U.S. Pat. No. 6,436,352 poses handling problems with regards to exothermal behaviour when the material is exposed to $N_2O$.

Example methods and apparatuses for $N_2O$ purification use more than one material to remove additional impurities. As a non-limiting example, molecular sieves may be used for moisture removal.

Figure 1:
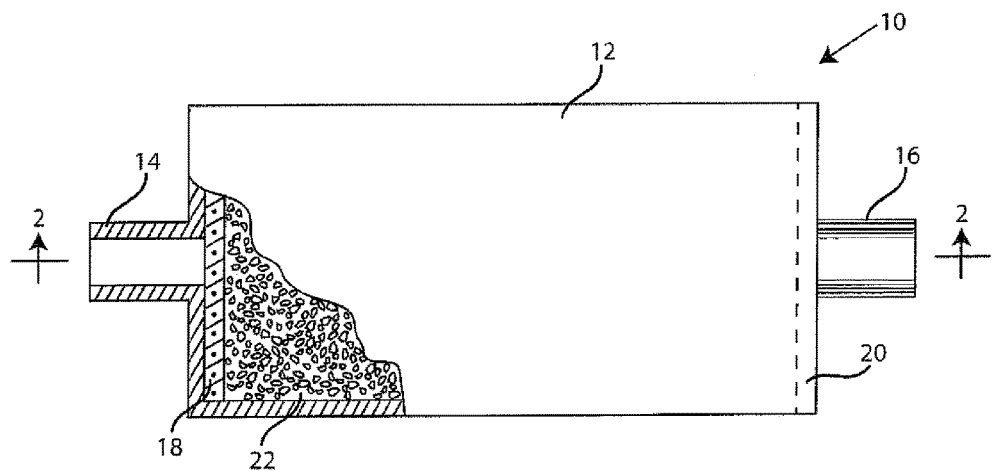
FIG. 1 is a partially broken elevational view of an example $N_2O$ purifier.
Figure 2:
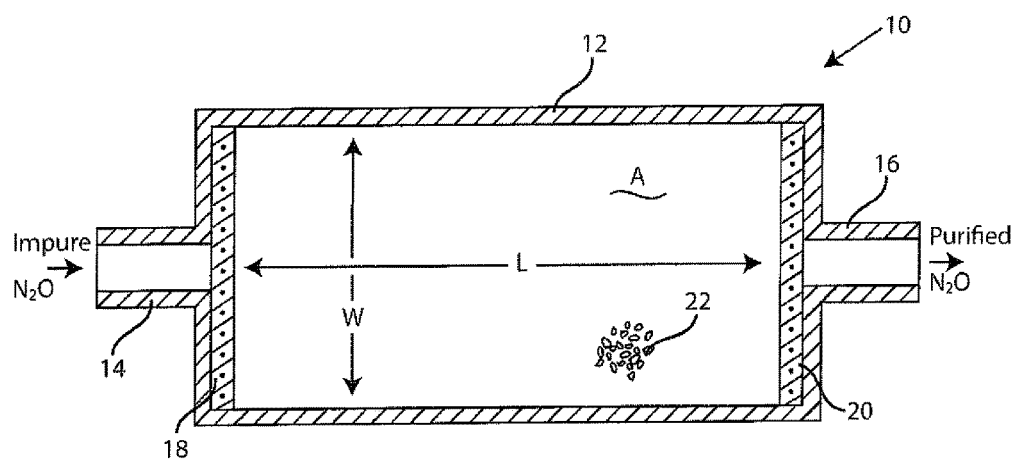
FIG. 2 is a cross-sectional view taken along line 2-2 of FIG. 1 with the purification material removed.

With reference to FIGS. 1 and 2, an example $N_2O$ purifier 10 includes a vessel 12 having an inlet 14 and an outlet 16. In this example, a first particle filter 18 abuts inlet 14 and a second particle filter 20 abuts outlet 16. Example purifier 10 will be discussed in greater detail subsequently.

In an embodiment, set forth by way of example and not limitation, a room temperature regenerable $N_2O$ purifier 10 includes a vessel 12 having an inlet 14 and outlet 16, an active portion A at least partially filled with a purification material 22 comprising nickel oxide and optional elemental nickel, wherein the weight ratio between the nickel oxide and the optional elemental nickel is equal or higher than 3 and the surface area of the nickel oxide and the optional elemental nickel is equal or higher than 50 $m^2/g$. In an example embodiment, the weight ratio between the nickel oxide and the optional elemental nickel is preferably equal or higher than 5 and the surface areas of the nickel oxide and the optional elemental nickel are equal to or higher than 100 $m^2/g$.

In this non-limiting example, room temperature purifier 10 does not include active mechanisms to decrease the temperature of the vessel 12. As will be discussed in greater detail subsequently, heaters and temperature control components, such as thermocouples, can be provided in certain example embodiments in order to perform and control the regeneration process.

In a non-limiting example, vessel 12 of the purifier 10 is a hermetically sealed vessel, normally made of metal. For example, vessel 12 can comprise stainless steel. The portion of the vessel 12 containing the purification material 22 is defined as the active portion A, which delimits an internal volume of the active portion. This portion is usually delimited by retainers such as particle filters 18 and 20.

With particular reference to FIG. 2, the active portion A of the vessel 12 defines a volume having a length L and a width W. Typically, the ratio between the length and the width is at least 1 in order to guarantee a sufficient contact time between the gas to be purified and the purification material. Preferably such ratio is not higher than 15 in order to avoid an excessive pressure drop caused by the purifier media. More preferably, the ratio L/W between the length and the width is between 1 and 15.

It will be appreciated that the example purifier 10 may have different volumes, notwithstanding the above dimensional limits on the length/width ratio of the active portion of the vessel, in order to accommodate different amounts of $N_2O$ nickel purification media to address the flow rate of the nitrous oxide gas and its desired level of purification. In certain non-limiting examples, it is preferred to have systems in which the ratio between the measure of the active portion volume (expressed in liters) and the $N_2O$ flow (expressed in $m^3$/hour) is between 0.05 and 2 liter/$m^3$/hour.

In an example embodiment where the target impurity is essentially and mainly $CO_2$, the purifier active portion A may be completely filled with the $N_2O$ nickel purification media. This is typically the case when the purifier system is used upstream or downstream of other purifier systems, such as, as a non-limiting examples, distillation towers and/or water removal systems. In an alternative example embodiment, for example when the purifier system is installed after the main gas supply and in the gas distribution system, the purifier hermetic vessel contains also other purification materials.

In various non-limiting examples, $N_2O$ nickel purification media fills at least 30% of the active portion A of the hermetically sealed vessel 12 of the purifier 10, and preferably at least 60% of the active volume.

Figure 3:
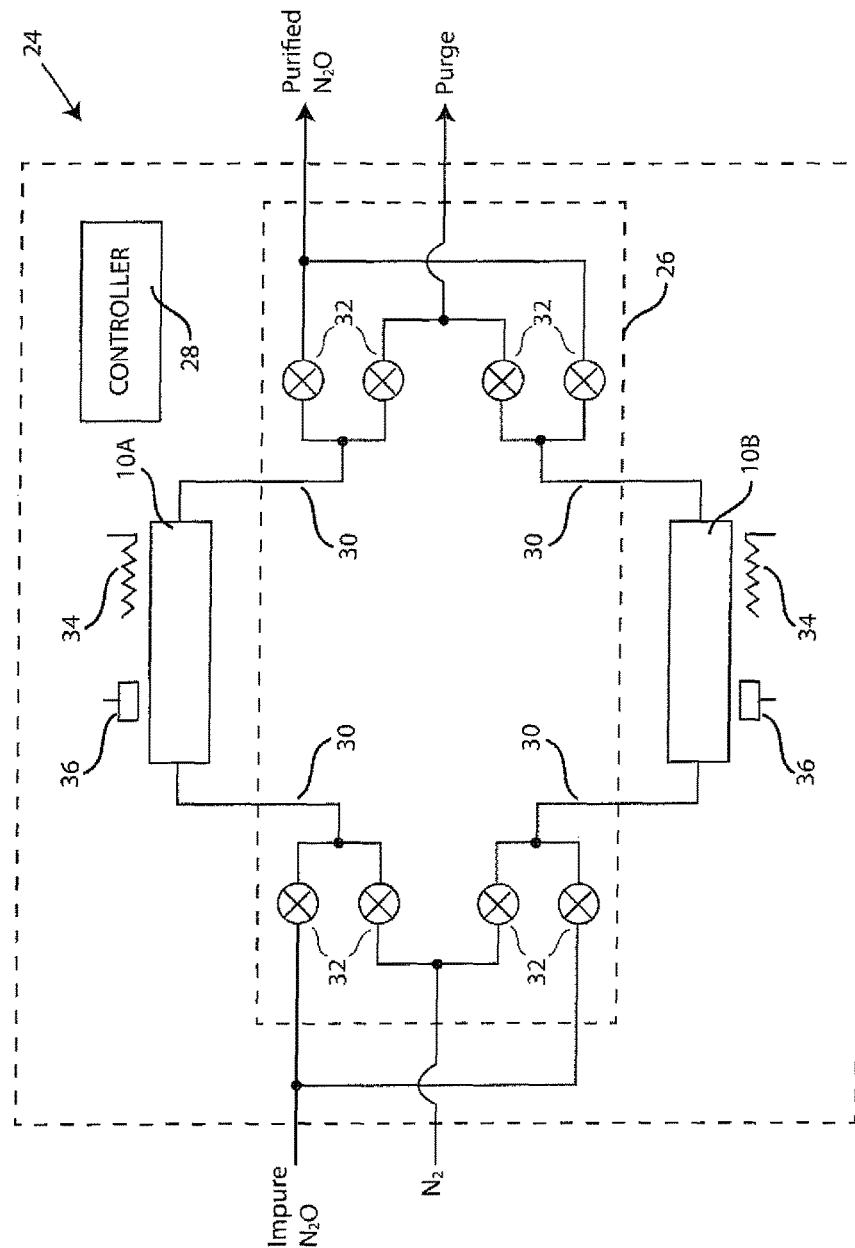
FIG. 3 is a block diagram of an example $N_2O$ purifier system.

FIG. 3 is a block diagram of an example $N_2O$ purifier system 24 including a first purifier 10A, a second purifier 10B, a manifold 26, and a controller 28. It will be appreciated that the purifier system 24 is advantageous in that it has at least two purifier vessels 10A/10B containing the $N_2O$ nickel purification media, and a suitable gas manifold 26 and its automatic valves, to selectively choose one purifier for gas purification and the other purifier for regeneration, so that there is no interruption in flow of purified $N_2O$ due to the regeneration process.

In $N_2O$ purification system 24, the purifiers 10A and 10B can be similar to, or the same as, the purifier 10 of FIGS. 1 and 2. The gas manifold includes a series of tubes 30, which are preferably made from stainless steel, as well as a number of automatic valves 32 which can be opened and closed under the control of controller 28. By properly opening and closing the valves 32, impure $N_2O$ can be directed through one of the purifiers 10A and 10B while $N_2$, for example, can be directed through the other of the purifiers 10A and 10B to facilitate the regeneration process. The purifier being regenerated is preferably heated by a heater 34 and monitored by a temperature sensor 36, which are also preferably coupled to controller 28.

The regeneration operation is carried out by flowing an inert gas, preferably nitrogen, through a purifier while heating the purifier vessel 12. There are no particular constraints on the nitrogen flow. For vessel having an active portion A of 10 liters, the nitrogen flow is advantageously comprised between 0.5 and 5 $m^3$/hour. More generally, such interval linearly scales with the vessel volume.

The temperature of the regeneration process is more important. In particular, the temperature is preferably between 150 and 300° C. for a regeneration time ranging from 1 and 24 hours. The duration of the regeneration process is directly related to the temperature of the vessel 12.

Various embodiments and aspects of the invention will be further illustrated with the help of the following non-limiting examples.

EXAMPLE 1

A 4 cc volume cylindrical purifier vessel with a length of 4.8 cm and a diameter of 1.04 cm has been filled with different purification materials, and subjected to an activation process, according to the scheme of Table 1 that indicates the material and the equilibrium temperature during the activation process. In Table 1 the parameters that are in common for all the samples have been omitted, i.e. the type of gas flown during the activation (Nitrogen), the flow (0.5 l/min), and the overall length of the activation process (21 hours).

TABLE 1

| Sample ID | Material | Equilibrium Temperature (° C.) |
|---|---|---|
| S1 | $N_2O$ nickel purification media: Essentially all the nickel was in form of NiO. | 200 |
| C1 | 13X molecular sieves | 200 |
| C2 | 4A molecular sieves | 200 |
| C3 | 5A molecular sieves | 200 |

Sample 1 was essentially made by supported fully oxidized nickel (NiO), since prior to the activation process the material was exposed to air. The nickel used for sample S1 had a surface area of 180 $m^2/g$.

All the previous samples had been exposed to a flow of $N_2O$, 0.1 l/min, containing about 50 ppm of $CO_2$, and the outlet of the purifier was connected to a Trace Analytical RGA5 gas chromatograph to determine the capacity of the purifier was exhausted, meaning that the instrument reading reached 0.5 ppm.

The results of this test are reported in Table 2, showing the capacity for each of the 4 samples evaluated.

TABLE 2

| Sample | Capacity (l/l) |
|---|---|
| S1 | 1.6 |
| C1 | Less than 0.1 |
| C2 | Less than 0.1 |
| C3 | Less than 0.1 |

It is possible to observe that comparative sample C1-C3, made with the three most common types of molecular sieves used in gas purifications used for the $CO_2$ removal, have a negligible capacity toward carbon dioxide when the matrix gas is $N_2O$, as further indication of the unforeseeable behaviour of the purifier media when employed in different matrix gasses.

EXAMPLE 2

Sample S1, made according to an example embodiment, has been subjected to a re-activation process, i.e. the activation process described in Table 1 has been repeated after the media in the vessel has exhausted its capacity (the analyser reading connected downstream reached 0.5 ppm). After reactivation the capacity of sample S1 has been measured obtaining the same value, as a proof that the material is fully regenerable and compatible with the application.

COMPARATIVE EXAMPLE 3

Nickel purification media has been subjected to an activation treatment that causes its reduction to nickel, by flowing a nitrogen stream with 10% of hydrogen. After having brought it at room temperature the purifier was exposed to $N_2O$ in a series of controlled cycles in order to condition the material, even with this precautions, the system temperature went over 250° C., posing serious problems in terms of safety. This tests show that the media disclosed in previously mentioned U.S. Pat. No. 6,436,352 is not suitable to be used in the Nitrous Oxide purification, in an industrial scale process.

Although various examples have been described using specific terms and devices, such description is for illustrative purposes only. The words used are words of description rather than of limitation. It is to be understood that changes and variations may be made by those of ordinary skill in the art without departing from the spirit or the scope of any examples described herein. In addition, it should be understood that aspects of various other examples may be interchanged either in whole or in part. It is therefore intended that the claims herein and hereafter presented be interpreted in accordance with their true spirit and scope and without limitation or estoppel.

What is claimed is:

1. A method for the purification of $N_2O$ comprising feeding a $N_2O$ gaseous stream to a vessel having an inlet and outlet, the vessel being at least partially filled with a purification material comprising nickel oxide and optional elemental nickel, the portion being filled with the purification material being a purifier active portion, wherein the weight ratio between the nickel oxide and the optional elemental nickel is equal or higher than 3 and the surface area of the nickel oxide and the optional elemental nickel is equal or higher than 50 $m^2/g$.

2. A method according to claim 1 characterized in that it is carried out at room temperature.

3. A method according to claim 2 wherein the weight ratio between the nickel oxide and the optional elemental nickel is equal or higher than 5 and the surface area of the nickel oxide and the optional elemental nickel is equal or higher than 100 $m^2/g$.

4. A method according to claim 3 wherein the purification material consists essentially of nickel oxide.

5. A method according to claim 4 wherein the purification material is supported.

6. A method according to claim 5 wherein the purification material is supported on at least one of amorphous silica and magnesium oxide.

7. A method according to claim 1 wherein the purification material consists of nickel oxide and optional elemental nickel.

8. A purification method according to claim 1 wherein the purification phase is alternate to a regeneration phase where the vessel is heated.

9. A method according to claim 1 wherein the active portion delimits a volume having a length L and a width W, wherein the ratio L/W between the length and the width is comprised between 1 and 15.

10. A method according to claim 9 wherein the ratio between measure of the active portion volume and value of the $N_2O$ flow is between 0.05 and 2 liter/($m^3$/hour).

* * * * *